(12) United States Patent
Rao

(10) Patent No.: US 9,049,649 B2
(45) Date of Patent: Jun. 2, 2015

(54) CONFIGURING CONSUMPTION OF SERVICE FOR ELECTRONIC DEVICES

(75) Inventor: Bindu Rao, Laguna Niguel, CA (US)

(73) Assignee: QUALCOMM Incorporated, San Diego, CA (US)

( * ) Notice: Subject to any disclaimer, the term of this patent is extended or adjusted under 35 U.S.C. 154(b) by 731 days.

(21) Appl. No.: 12/937,551

(22) PCT Filed: May 9, 2008

(86) PCT No.: PCT/US2008/063168
§ 371 (c)(1),
(2), (4) Date: Oct. 13, 2010

(87) PCT Pub. No.: WO2009/136939
PCT Pub. Date: Nov. 12, 2009

(65) Prior Publication Data
US 2011/0029607 A1  Feb. 3, 2011

(51) Int. Cl.
*G06F 15/16* (2006.01)
*G06F 15/177* (2006.01)
*H04M 3/493* (2006.01)
*G06F 9/44* (2006.01)
*H04W 48/18* (2009.01)
*H04W 80/00* (2009.01)
*H04W 4/00* (2009.01)
*H04W 28/18* (2009.01)

(52) U.S. Cl.
CPC .............. *H04W 48/18* (2013.01); *H04W 80/00* (2013.01); *H04W 4/00* (2013.01); *H04W 28/18* (2013.01)

(58) Field of Classification Search
CPC ..... H04W 76/022; H04W 48/18; H04W 4/00; G06F 21/335; H04L 63/0815
See application file for complete search history.

(56) References Cited

U.S. PATENT DOCUMENTS

| | | | |
|---|---|---|---|
| 6,222,853 B1 * | 4/2001 | Marttinen et al. | 370/465 |
| 7,123,630 B1 | 10/2006 | Ueno | |
| 7,441,007 B1 * | 10/2008 | Kirkpatrick et al. | 709/213 |
| 8,009,619 B1 * | 8/2011 | Clavel et al. | 370/329 |
| 8,060,594 B1 * | 11/2011 | Clavel et al. | 709/223 |
| 2005/0033693 A1 | 2/2005 | Toiminen | |

(Continued)

FOREIGN PATENT DOCUMENTS

| | | |
|---|---|---|
| CN | 101097579 A | 1/2008 |
| EP | 0991218 | 4/2000 |

(Continued)

OTHER PUBLICATIONS

Nikula, E.; Toskala, A.; Dahlman, E.; Frames Multiple Access for UMTS and IMT-2000, Apr. 1998, 9 pages.

(Continued)

*Primary Examiner* — Joshua Joo
*Assistant Examiner* — Younes Naji
(74) *Attorney, Agent, or Firm* — Kilpatrick Townsend & Stockton LLP

(57) ABSTRACT

One embodiment of a method for configuring consumption of service includes identifying a service to be consumed by a user, identifying a plurality of bearer technologies across which at least one electronic device can access the service, selecting one of the plurality of bearer technologies for use in configuring the at least one electronic device, and configuring the at least one electronic device for the service using one of a plurality of management frameworks according to the selected bearer technology.

15 Claims, 2 Drawing Sheets

(56) References Cited

U.S. PATENT DOCUMENTS

| | | |
|---|---|---|
| 2005/0039178 A1* | 2/2005 | Marolia et al. ............... 717/168 |
| 2006/0039349 A1* | 2/2006 | Samuel et al. ............... 370/351 |
| 2007/0169093 A1* | 7/2007 | Logan et al. ................. 717/168 |
| 2007/0204050 A1 | 8/2007 | Liu et al. |
| 2007/0294385 A1* | 12/2007 | Kapadekar et al. ........... 709/223 |
| 2008/0052026 A1* | 2/2008 | Amidon et al. .............. 702/104 |
| 2008/0146194 A1* | 6/2008 | Yang et al. ................... 455/411 |

FOREIGN PATENT DOCUMENTS

| | | | | |
|---|---|---|---|---|
| EP | 0991218 A2 | | 4/2000 | |
| GB | 2366700 A | * | 3/2002 | ............... H04Q 7/32 |
| WO | WO 2008044877 A1 | * | 4/2008 | ............... H04L 12/24 |

OTHER PUBLICATIONS

International Searching Authority, International Search report and The Written Opinion, 11 pages, Jan. 2009.

* cited by examiner

CONFIGURING CONSUMPTION OF SERVICE FOR ELECTRONIC DEVICES

BACKGROUND

As more and more services become available for electronic devices such as mobile telephones and personal digital assistants (PDA's), and various features converge in new electronic devices, configuring the devices is becoming increasingly complicated. For example, many cellular telephones are now capable of connecting to the Internet as well as making telephone calls. This convergence of features in a device typically complicates the configuration of the device for the various features supported by the device. Device configuration is further complicated by the ability of devices to connect to services using multiple technologies or bearers, such as a cellular network (e.g., code division multiple access or CDMA), a Worldwide Interoperability for Microwave Access (WiMAX) network connecting to the Internet or an enterprise network, etc. Services are often provided by sources other than the network operator. Multiple devices may be used by a user to consume a service, such as a streaming video service from a single provider that can be accessed using a cellular telephone, a personal digital assistant (PDA), a desktop computer, etc.

Configuration of accounts and devices to consume services is therefore becoming difficult for users in this increasingly complex landscape.

SUMMARY

One embodiment of a method for configuring consumption of service includes identifying a service to be consumed by a user, identifying a plurality of bearer technologies across which at least one electronic device can access the service, selecting one of the plurality of bearer technologies for use in configuring the at least one electronic device, and configuring the at least one electronic device for the service using one of a plurality of management frameworks according to the selected bearer technology.

DESCRIPTION

The drawings and description, in general, disclose a system and method for configuring consumption of service for electronic devices. Rather than focusing on device configuration and service configuration, an approach taken herein is to consider the consumption of service by a user in totality. The user may be able to access a service via multiple bearer technologies and using multiple devices. For example, a user may be able with proper account and device configuration to access a service from various different devices and via various different networks as the user moves from home to work to remote office. Devices may be configured via more than one bearer technology using one or more of a number of available management frameworks. The system and method of configuring consumption of service disclosed herein greatly simplifies configuration of accounts and devices in this complex environment.

Some of the terms used in this description may be defined and exemplified as follows:

Management Framework: A system, interface or protocol used to control and configure an electronic device, for example, the OMA-DM, TR-069 and WSMAN based management frameworks. The management framework may encompass a management client in a mobile device, a bearer technology used to connect to the management client in the mobile device (from a management server), and software in a management server used to connect to the management client in the mobile device over the bearer technology. This software in the management server may have a modular architecture such as a plugin adapter or may be hard-coded. Thus, one exemplary framework may have an OMA-DM server running on the management server, an OMA-DM client running in the mobile device and an OMA-DM communication protocol between them over a cellular network bearer. Another exemplary framework may have a TR-069 server, a TR-069 client and a TR-069 communication protocol between them employing a DSL link as a bearer. The management framework includes the handshake with the specific language (protocol), the command structure and the management objects being manipulated by the command structure.

Management Object: A representation of client side functionality and settings, that can be exposed by a device to a remote server for management purposes.

Management Object Model: A specification (sometimes standardized) that makes it possible for a server to remotely manage a device and alter configuration, etc. in a plurality of devices, often in a variety of heterogeneous devices.

Management Protocol: A command language and a handshake used by a server and a client (in device) to implement device management.

Bearer Technology: A radio network interface such as CDMA, GSM or WiMAX that implements a standard communication protocol, over which networking protocols such as TCP/IP and data services can be provided. Also referred to herein as a connection channel or a network.

Figure 1:
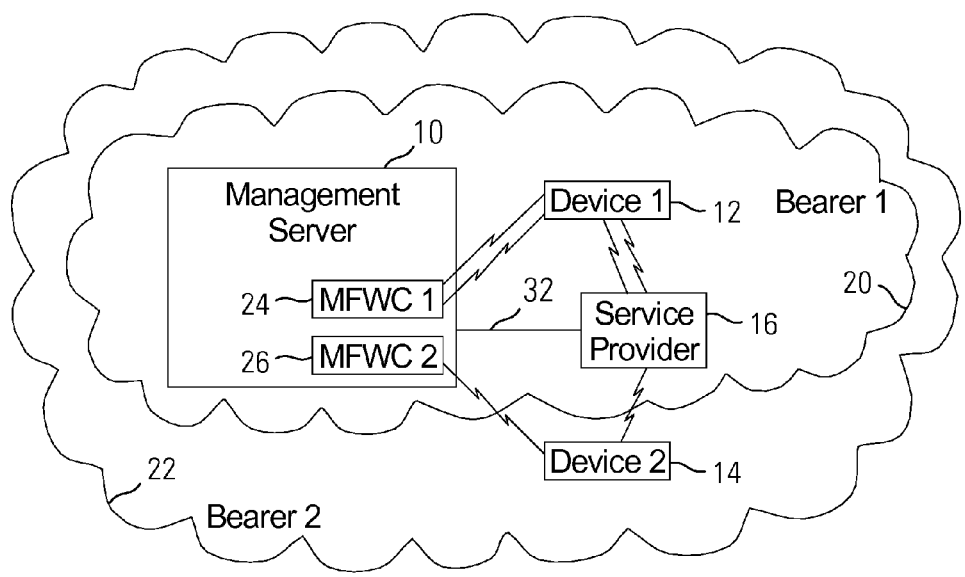
FIG. 1 is a block diagram of an exemplary system for configuring consumption of service.

Referring now to FIG. 1, a management server or management authority 10 is used to configure one or more devices (e.g., 12 and 14) to enable a user to consume a service from one or more service providers (e.g., 16). The service may be accessible by the devices 12 and 14 via one or more bearer technologies (e.g., 20, 22). (As illustrated, the first exemplary device 12 can access the service via either of the overlapping bearer technologies 20 and 22 while the second exemplary device 14 is in range only of the second bearer technology 22.) For example, a user may purchase a mobile phone or PDA and subscribe to a streaming music or video service. The service may be accessible via multiple data networks such as CDMA, WiMAX or 3GPP networks, etc. Rather than simply downloading an application on each device and manually configuring it to access the service using a particular network, the management server 10 connects to a device 12 using ene or more bearer technologies 20 and 22 and configures the device to access the service via any bearer technology available to the device and suitable for delivery of the service. Management of service consumption also incorporates setting server side accounts for the service corresponding to the subscriber and download of any client or connectivity means to the device 12, if they do not already exist (or to update them). The management server 10 may thus update account information at the service provider 16 and may transfer and configure any appropriate applications to the device 12. In particular, the management server 10 informs the service provider 16 when the user of the device 12 changes networks (bearers) or changes devices. It informs the service provider 16 of the new characteristics of the device if it migrates from one network to another, or from one bearer to another, wherein the different networks/bearers comprise different communication characteristics or throughput capabilities.

As service may be consumed across several different bearer technologies 20 and 22, more than one connectivity management object (one connectivity management object or parameter set for each bearer for example), is provisioned in the device 12 when the user subscribes to a service. That is, if the device 12 can access the service via more than one bearer technology 20 and 22, the device 12 may have multiple management objects to be configured, one per bearer technology 20 and 22. Each management object in the device 12 contains the settings enabling the device 12 to connect to the service via the associated bearer technology 20 and 22. The management server 10 includes multiple management framework components 24 and 26, for example one per device 12 (or device type) and bearer technology 20 combination, that are customized to configure the device 12 for use with the associated bearer technology 20. Each server-side management framework component 24 and 26 is adapted to manipulate at least one management object in the device 12 via a particular bearer technology, thereby configuring the device 12 to consume a service via an associated bearer technology 20. By using a common or similar management object model for each of the management objects in the device, the multiple server-side management framework components 24 and 26 can be designed to support the management object model and the associated commands to manipulate the management object model. Thus, a device 12 can be managed by different management frameworks, even employing different management protocols, as long as the management objects being manipulated are the same or are similar (or equivalent in terms of the action or code invoked in the device). Each management framework may employ a different management protocol. As described above, in one embodiment the management framework components in the management server may be modular by using plugin management framework adapters in the management server 10. In other embodiments, the management authority 10 may be hard-coded or designed to support multiple management frameworks without plug-in adapters.

The management authority 10 may be connected to the device 12 across any suitable bearer technology 20 or 22 to configure the consumption of service, and in any suitable manner now known or that may be developed in the future. The device 12 may be configured at the point of sale or using an over the air bootstrap procedure to enable the device 12 to contact the management authority 10 for provisioning and configuration when a service is subscribed to. If the management authority 10 does not already have the device information, it can, for example, send an SMS message to the device 12 with a device management notification message, causing the device 12 to contact the management authority 10 to open up a management session and to provide device information such as make, model, version, etc. Alternatively, the device 12 can send an SMS message back to the management authority 10 with its make, model, version and other details. The management authority 10 can use this information to determine what needs to be configured on the device 12 for a particular service, including determining what applications will be needed on the device 12, and what the preferred/default management protocol is that is supported by the device 12. The management authority 12 can configure the device 12 and install applications in a single session or in multiple sessions.

The management authority 10 can use one or more management frameworks to configure a device 12. For example, in FIG. 1, the management authority 10 could use either of the two management framework components 24 and 26 to configure device 12 if they are adapted to the two bearer technologies 20 and 22 that are in range of device 12. The management authority 10 may select the management framework corresponding to the bearer technology currently used by the device 12 to contact the management authority 10. The device 12 typically uses whatever bearer technology is used to bootstrap the device 12. For example, if the device 12 is bootstrapped using a CDMA network, and it thereafter contacts the management authority 10 via the CDMA network, the management authority 10 may use a management framework associated with the CDMA network, such as an OMA-DM based framework, to configure the device 12. If the management objects in the device 12 use a common or similar management object model, the management framework associated with the CDMA network (OMA-DM based for example) may configure each management object in the device 12 so that the device 12 can consume the service using any available bearer technology supported by the device 12. In another embodiment, the management authority 10 may select a management framework to configure the device 12 based on a knowledge of what bearer technologies are supported by the device 12, or based on a history of prior interactions with the device 12. For example, if a prior interaction with the device 12 was carried out via a WiMAX network, the management authority 10 may use a WiMAX network and an associated management framework (which may not be based on OMA-DM, for example) to configure the device 12, even if the device 12 initiates the management session over a COMA network. To do this, the management authority 10 may send a UDP based notification over a WiMAX network.

The management authority 10 may connect to the service provider 16 during the configuration process to access user account information and configuration information, applications for electronic devices, etc. For example, the quality of service available for the user on the device 12, 14 may vary based on subscription type and capabilities of the device and the bearer technology, meaning that the quality of service parameters should be configured differently in the device 12, 14. The management authority 10 may connect to the service provider 16 to determine and configure this type of information in any suitable manner, such as over the same bearer technologies 20 and 22 as the electronic devices used to consume service, or via the Internet on a wired connection 32, etc.

The management authority 10 may also configure the device 12 to select one of a number of bearer technologies 20 and 22 to use to consume a service based on the capabilities of the bearer technologies, connection strength, connection cost, location of the device 12 such as whether it is in a facility that offers low cost Internet access, etc.

Configuration settings and parameters are stored in the device memory locations or addresses that are accessed via management objects (that serve as an interface), which as discussed above, may use a common or similar management object model if desired so that they may be manipulated using any of a number of management frameworks by the management authority. In another embodiment, the management frameworks may be customized so that each manipulates management objects of a different management object model.

Figure 2:
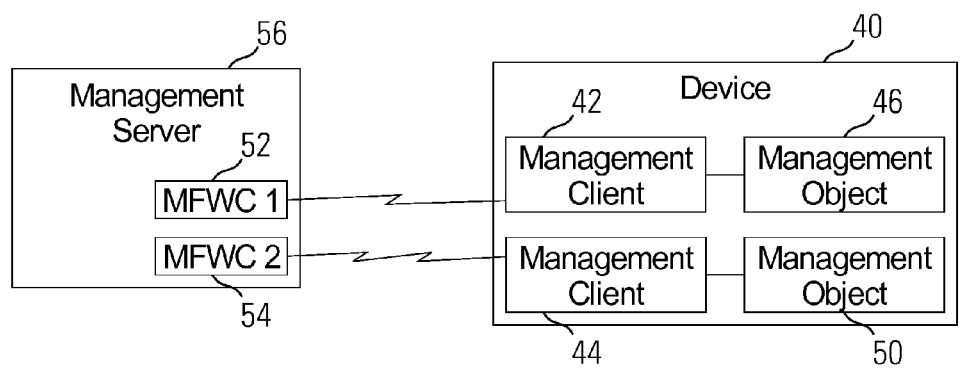
FIG. 2 is a block diagram of an exemplary system for configuring consumption of service wherein a device includes multiple management clients.
Figure 3:
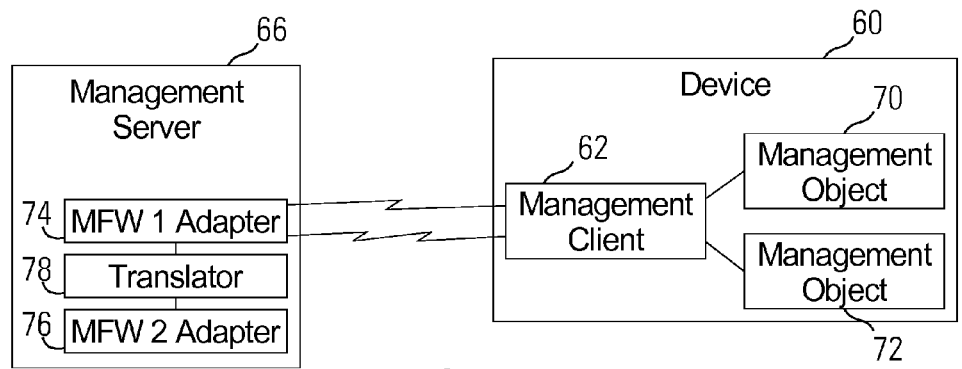
FIG. 3 is a block diagram of an exemplary system for configuring consumption of service wherein a device includes a single client.

The management objects in a device may be directly manipulated by one or more management clients in a device, with the management clients communicating with the management authority using a particular management protocol associated with the selected management framework. Typically each management client is likely to be used with one type of management protocol supported by the device, with the management client capable of being provisioned by a corresponding management server that employs a particular type of management framework. A management client is tailored both for communication with the management authority (via a management server managed by the management authority) and to manipulate management objects of a particular management object model in the device, such manipulation often resulting in parameters being set, functionality being invoked, data being modified, etc. A device 40 may have multiple management clients 42 and 44 that each manage a management object 46 and 50 via different management protocols as illustrated in FIG. 2. Each management client 42 and 44 connects to a different management framework component 52 and 54 in the management server 56.

In another embodiment, a device 60 may have a single management client 62 to reduce device cost (or resources consumed in the device). Multiple management frameworks are involved in order to support multiple management objects 70 and 72 in the device 60, as well as to support multiple bearer technologies to connect to the device 60. Thus a server-side adapter 74 for a first management framework may be used that is designed to communicate with management client 62 over a particular bearer technology to set parameters in management object 70. A second server-side adapter 76 for a second management framework may be used that is designed to set parameters corresponding to a second management object 70 in the device 60. If the second server-side adapter 76 is not designed to communicate with the single management client 62, a translator 78 may be provided in the management server 66 enabling the second server-side adapter 76 to communicate with the management client 62 through the first server-side adapter 76. (Note that the adapters comprise modular software as described above, but that the server-side management framework components may also be hard-coded if desired rather than the modular adapters 74 and 76.) Thus, the management client 62 handles one single management protocol and the management server 66 supports one or more frameworks, such as by the use of appropriate management-framework specific adapters 74 and 76 on the management server 66 with translators (e.g., 78) as desired. These adapters 74 and 76 can therefore be considered protocol specific adapters. The management client 62 manages multiple management objects 70 and 72 under control of one or more management framework adapters 74 and 76, with server-side communication passing through one adapter 74 and other adapters (e.g., 76) using translators (e.g., 78) to communicate through the one adapter 74.

Figure 4:
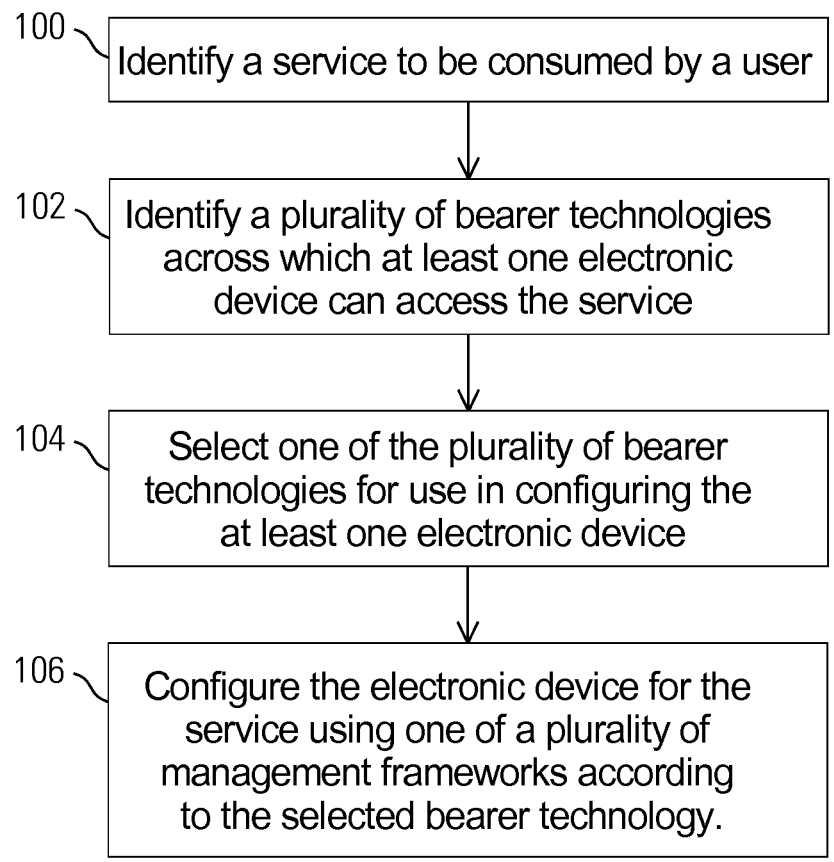
FIG. 4 is a flowchart of an exemplary operation for configuring consumption of service.

Referring now to FIG. 4, the method of configuring consumption of a service will be summarized. A service to be consumed by a user is identified 100. A plurality of bearer technologies across which at least one electronic device can access the service is identified 102. One of the plurality of bearer technologies is selected 104 for use in configuring the at least one electronic device (for at least one service desired). The electronic device is configured 106 for the service using one of a plurality of management frameworks according to the selected bearer technology.

Although exemplary embodiments have been described herein, the system and method for configuring consumption of service is not limited to any particular type of device, service, service provider or bearer technology. The system and method described herein configures the consumption of service for a user, simplifying the configuration process particularly in complex environments such as multiple devices with different capabilities, multiple bearer technologies, etc.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A method for configuring consumption of service, the method comprising:
    identifying a service to be consumed by a user;
    identifying a plurality of bearer technologies across which at least one electronic device is configured to access said service;
    identifying a device type of the at least one electronic device;
    selecting one of said plurality of bearer technologies for use in configuring said at least one electronic device;
    selecting a plurality of management framework components of a management server based on the identified device type and the selected bearer technology, each of the plurality of management framework components corresponding with a device type and bearer technology combination; and
    configuring said at least one electronic device for said service using the selected plurality of management framework components, each of said plurality of management framework components being used to control a different management client on said at least one electronic device.

2. The method of claim 1, wherein said selecting and said configuring are performed by the management server.

3. The method of claim 1, wherein said plurality of management framework components support an at least partially common management object model in said at least one electronic device.

4. The method of claim 1, said configuring comprising configuring multiple management objects in said at least one electronic device, one per bearer technology supported by said at least one electronic device.

5. The method of claim 1, said configuring comprising enabling said at least one electronic device to consume said service via each of said plurality of bearer technologies.

6. The method of claim 2, further comprising said management server controlling downloading and configuring of an application in said at least one electronic device, said application being used to present said service on said at least one electronic device.

7. The method of claim 1, said configuration comprising configuring a quality of service on said at least one electronic device based at least in part on a factor selected from the group consisting of service type subscribed to by said user, bearer technology used to access said service and capabilities of said at least one electronic device.

8. The method of claim 1, wherein said selection of said bearer technology used to configure said at least one electronic device is based on at least one of: the bearer technology used by said at least one electronic device to contact said management server, a history of prior interactions between said management server and said at least one electronic device, and at least one capability of said bearer technology.

9. The method of claim 2, the method further comprising said management server configuring a provider of said service with at least one user account corresponding with said service.

10. The method of claim 1, wherein said at least one electronic device is configured to select one of said plurality of bearer technologies to access said service based at least in part on a characteristic selected from the group consisting of connection cost, connection speed, efficiency, location of said at least one electronic device, available bearer technologies and capabilities of said at least one electronic device.

11. The method of claim 2, said management server using more than one of said plurality of management framework components to configure said at least one electronic device.

12. The method of claim 11, said management server translating communications from the plurality of management framework components to configure said at least one electronic device through a single client-side management client.

13. A system for configuring consumption of service, the system comprising:
   at least one electronic device capable of using a service;
   at least one connection channel between a provider of said service and said at least one electronic device; and
   a management authority connectable to said at least one electronic device via at least one of said at least one connection channels, wherein the management authority comprises a plurality of management framework components, each of the plurality of management framework components corresponding with a device type and bearer technology combination, said management authority using a plurality of management framework components to configure said at least one electronic device to use said service based on an identified device type and a selected bearer technology, each of said plurality of management framework components being used to control a different management client on said at least one electronic device.

14. The system of claim 13, said at least one electronic device comprising a plurality of management objects each having a management object model that is substantially uniform such that said plurality of management framework components manipulate said plurality of management objects.

15. The system of claim 13, said management authority comprising at least one translator enabling said management authority to use said plurality of management framework components to configure said at least one electronic device through a single management client in said at least one electronic device, said plurality of management framework components each using a different management protocol.

* * * * *